United States Patent
Jolley et al.

(10) Patent No.: US 6,201,052 B1
(45) Date of Patent: Mar. 13, 2001

(54) POWDER-COATING COMPOSITIONS CONTAINING TRANSFER EFFICIENCY-ENHANCING ADDITIVES

(75) Inventors: Scott T. Jolley, Mentor; Charles F. Williams, Strongsville, both of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/199,498

(22) Filed: Nov. 25, 1998

(51) Int. Cl.$^7$ ........................................... C08J 7/04
(52) U.S. Cl. ..................... 524/292; 524/295; 524/319
(58) Field of Search ................... 524/280, 290, 524/292, 295, 319, 340, 341, 322

(56) References Cited

U.S. PATENT DOCUMENTS

| | | | |
|---|---|---|---|
| 4,107,148 | * 8/1978 | Fujiyoshi et al. | 528/273 |
| 4,748,084 | * 5/1988 | Hata et al. | 428/425.9 |
| 4,762,568 | * 8/1988 | Nakamura et al. | 106/403 |
| 4,859,760 | * 8/1989 | Light, Jr. et al. | 528/45 |
| 4,908,225 | 3/1990 | Niimura et al. | 427/25 |
| 5,021,473 | 6/1991 | Macholdt et al. | 523/451 |
| 5,069,994 | 12/1991 | Gitzel et al. | 430/110 |
| 5,073,579 | 12/1991 | Macholdt et al. | 524/255 |
| 5,274,184 | 12/1993 | Nagl et al. | 562/429 |
| 5,393,846 | * 2/1995 | Hammerton et al. | 525/374 |
| 5,576,389 | * 11/1996 | Ueno et al. | 525/119 |
| 5,710,221 | * 1/1998 | Kaplan et al. | 525/438 |
| 5,863,875 | * 1/1999 | Steckel | 508/551 |
| 5,905,119 | * 5/1999 | Kaplan et al. | 525/328.8 |
| 5,925,698 | * 7/1999 | Steckel | 524/322 |

FOREIGN PATENT DOCUMENTS

| | | |
|---|---|---|
| 1258818 | * 7/1962 | (DE) . |
| 0315082 | 5/1989 | (EP) . |
| 0367162 | 5/1990 | (EP) . |
| 0371528A1 | 6/1990 | (EP) . |
| 0480270 | 4/1992 | (EP) . |
| 0769530 | 4/1997 | (EP) . |
| 0117756 | * 10/1973 | (JP) . |

* cited by examiner

*Primary Examiner*—Edward J. Cain
*Assistant Examiner*—Katarzyna Wyrozebski-Lee
(74) *Attorney, Agent, or Firm*—Samuel B. Laferty; Michael F. Esposito

(57) ABSTRACT

This invention relates to a powder coating composition made from at least two components comprising (A) a film forming resin composition; and (B) a transfer efficiency enhancing amount of at least one aromatic ring compound containing at least two substituents, wherein one of the two substituents is selected independently from the group consisting of (i) groups containing at least one carboxy or a carboxy producing moiety; (ii) alkoxy groups; and (iii) halogen groups; and the second substitutent is a nitro or a halogen group; wherein component (B) is incorporated into the powder coating composition by addition of component (B) to an extruded composition comprising components other than component (B) The invention also relates to a method for coating a substrate using the foregoing powder coating composition.

36 Claims, 1 Drawing Sheet

POWDER-COATING COMPOSITIONS CONTAINING TRANSFER EFFICIENCY-ENHANCING ADDITIVES

BACKGROUND OF THE INVENTION

1. Field of the Invention

The present invention relates to powder coating compositions, specifically to powder coating compositions containing additives that improve the transfer efficiency of the powder coating compositions.

2. Description of the Related Art

It is known that during the application of a powder-coating composition on to substrate, not all of the coating composition ends up on the substrate. The amount of powder-coating material being applied on to a substrate that actually ends up on the substrate as the powder coating relates to the transfer efficiency of the process. The transfer efficiency can be calculated by dividing the change in weight of the substrate by the change in weight of powder coating source dispensing the powder coating composition wherein the change in weight is the weight difference before and after the application of the powder coating. The transfer efficiency is conveniently expressed as a percent.

Although the powder coatings market is growing rapidly, one of the limiting factors for continued growth is the transfer efficiency. Typical powder coating application lines have first pass powder transfer efficiency from spray point to substrate of about 50–80%. The remaining powder has to be reclaimed and re-sprayed. Although this respray ability enables the powder coatings industry to cite lower coating costs and higher utilization of raw materials (of up to 95%) than liquid, solvent-based coatings it does decrease the efficiency of the process.

Furthermore, in some applications recycling powder is not possible owing to issues relating to appearance and quality of the finished part. One such area is in automotive clear coat applications. In these applications, the recycled material may contain lint or other foreign matter that is likely to cause defects in the finished coated automotive part. Also, when using metallic or other dry blended systems (expensive color, etc.), the components may not transfer at equal rates (for example, metallic pigments or colors transfer at a different rate than the rest of the coating). Any reclaimed material looks different than the originally transferred coating. Thus spraying reclaimed material here amounts essentially to spraying to waste. This adds further cost to an already expensive dry blending process that is used to mix some of the components together to make the coating. Clearly there is a need for improving the transfer efficiency of powder coatings. The present invention fulfils such a need.

A transfer efficiency additive can positively affect the economics of the powder coating process. If recycling and reclaiming of powder-coating compositions are not feasible or desired, as mentioned above for automotive clear coats or when using metallic colors, then an efficient first-pass transfer becomes even more important. Two other factors that could be affected by a transfer efficiency additive are: 1) an improvement in the ability of the powder spray to penetrate into corners and close spaces, and 2) improving the ability of very small size powder coating particles to efficiently transfer and build on a metal substrate. Some industry sources estimate that an increase of about 3 to 5% in transfer efficiency would justify the cost involved in adding a transfer efficiency additive to achieve this increased transfer efficiency.

U.S. Pat. No. 5,073,579, Macholdt et al., Dec. 17, 1991, discloses a process for enhancing the electrostatic chargeability of powder coatings or powders intended for surface-coating solid objects, by homogeneously incorporating at least one triarylmethane, azine, thiazine and/or oxazine compound in an amount from about 0.01 to about 10 percent by weight into powder coatings or powders, the compounds mentioned being dissolved or dispersed in the powder coating system or powders.

U.S. Pat. No. 5,021,473, Macholdt et al., Jun. 4, 1991, discloses a triboelectrically sprayable powder coating composition consisting essentially of (1) an epoxy resin; or
(2) a hydroxyl- or carboxyl-containing polyester resin; or
(3) an acrylic resin; or
(4) a combination of hydroxyl-or carboxyl-containing polyester resin and epoxy resin, or combinations thereof, and, homogeneously distributed, dissolved, or dispersed in said powder-coating composition, about 0.01 to about 10 percent by weight of at least one salt-like cationic compound of the formula (1)

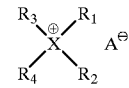

(1)

in which $R_1$, $R_2$, $R_3$ and $R_4$, independently of one another, denote hydrogen atoms, straight-chain or branched alkyl groups having 1 to 30 carbon atoms, mononuclear or polynuclear cycloaliphatic radicals having 5 to 12 carbon atoms, oxethyl groups of the formula —$(CH_2$—$CH_2$—$O)_n$—R in which n denotes a number from 1 to 10 and R denotes a hydrogen atom, a $(C_1$–$C_4)$-alkyl or acyl group, furthermore denote a mononuclear or polynuclear aromatic radicals or araliphatic radicals, where the aliphatic, aromatic and araliphatic radicals may be substituted by hydroxyl, $(C_1$–$C_4)$ alkoxy, secondary or tertiary amino groups, acid amide groups and/or acid amide groups, where the alkyl, cycloalkyl, aralkyl and aryl radicals for $R_1$ to $R_4$ may be substituted by fluorine, chorine or bromine atoms, X denotes a phosphorus, arsenic or antimony atoms, where, in the case where X denotes an arsenic or antimony atom, at least one of the radicals $R_1$–$R_4$ does not denote a hydrogen atom, and $A^-$ denotes the equivalent of an inorganic or organic anion. This patent also discloses a method for enhancing the electrostatic chargeability of a triboelectrically sprayable powder-coating composition comprising the above composition in an amount from about 0.01 to about 10 percent by weight into powder coatings.

European Patent Publication 0 371 528 Al, Stamicarbon, Jun. 6, 1990, discloses a triboelectrically processable powder coating based on a polyester-containing binding agent and a nitrogen-containing additive, characterized in that the nitrogen-containing additive is a sterically hindered tertiary amine or aminoalcohol.

U.S. Pat. No. 4,908,225, Niimura et al., Mar. 13, 1990, discloses a method of electrostatic coating, which comprises electrostatically coating a surface with a resin powder composition, wherein said composition comprises a thermosetting or thermoplastic resin the improvement comprising incorporating into said resin, an electric charge-increasing agent selected from the group consisting of a phthalocyanine compound, an anthraquinone compound, a metal compound of an organic carboxylic acid and an alkyl onium salt.

SUMMARY OF THE INVENTION

The present invention relates to powder coating compositions comprising (A) a film forming resin composition; and (B) a transfer efficiency enhancing amount of at least one aromatic ring compound containing at least two substituents, wherein one of the two substituents is selected independently from the group consisting of (i) groups containing at least one carboxy or a carboxy producing moiety; (ii) alkoxy groups; and (iii) halogen groups; and the second substituent is a nitro or a halogen group. The invention also relates to a method for coating a substrate using the foregoing powder coating composition.

DETAILED DESCRIPTION OF THE INVENTION

Figure 1:
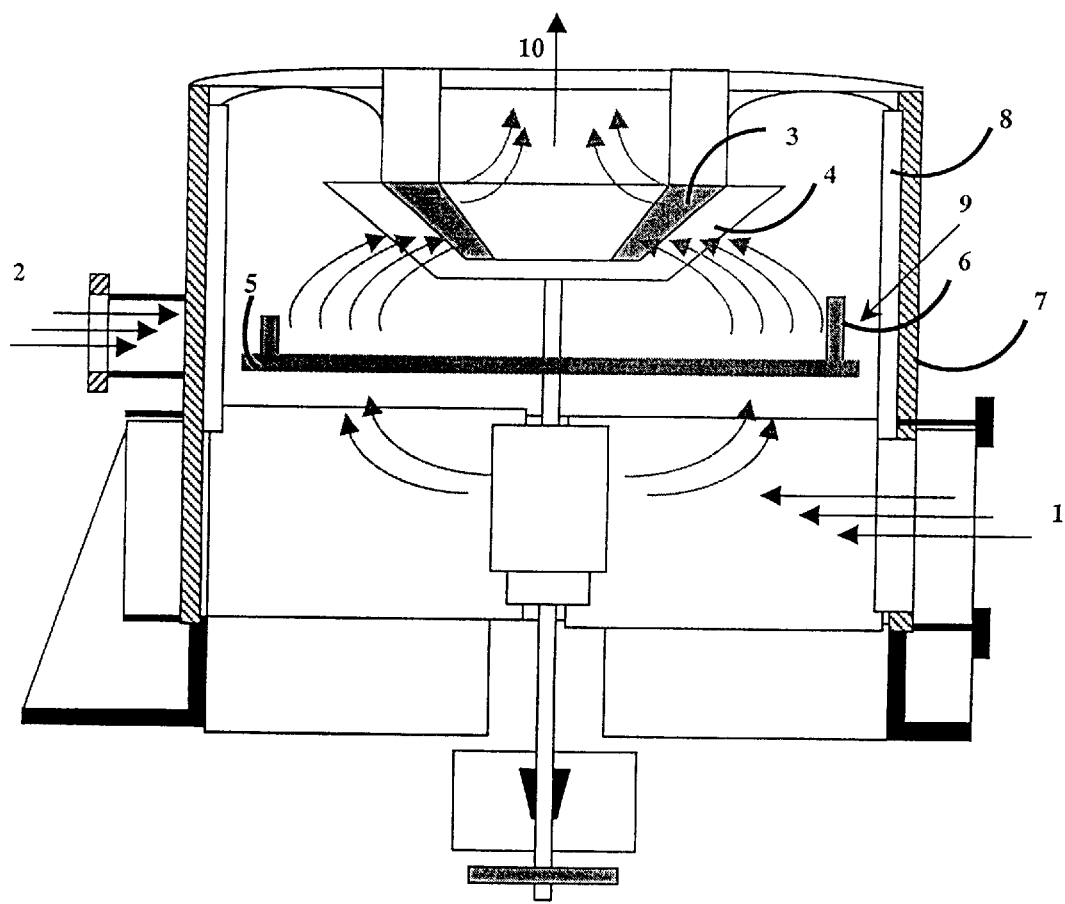
FIG. 1 is a diagram of an air classifying mill used in the post-addition of the additive compound of the present invention.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The Powder Coating Composition

Powder coating compositions are well known to those skilled in the art. They are coating compositions made almost entirely from solid components. Although in such a composition, there might be a few components that might be in the form of a liquid, the composition as a whole is in the form of a powder. The word "powder" here is meant to include not only materials with a very small particle size (less than about 10 micron) but also those with larger sizes, such as granules and other particulate matter. Typically, the particle size of a power coating composition will vary from about 0.3 to about 300 microns, more commonly from about 0.3 to about 105 microns. Powder coatings were developed in response to a recognized need and desire by the coatings industry to reduce energy consumption and solvent emission.

Film-Forming Resin Composition

One component of the present powder coating composition is a film forming resin composition. The words "film forming resin composition" include the complete system of:

1) a polymer (also called resin or "binder") that is capable of forming a film (the "film-forming resin") either with a curing agent (also known as crosslinking agent, curative, crosslinker or hardener) or without a curing agent (such as by air-drying or by the application of heat);

2) a crosslinking agent, if necessary;

3) any catalyst or accelerator that may be necessary to facilitate the reaction between the film forming resin and the crosslinking agent.

Polymers, which can be employed as the film forming resin, include oil-free polyester resins, acrylic resins and epoxy resins.

As the words "film forming resin composition" include any curative (crosslinking agent) that may be used for crosslinking, the aforementioned resins also intrinsically include urethane resins which form when a di-or polyisocyanate group (—NCO—) bearing intermediate (such as an isocyanate curative) reacts with a di- or polyhydroxyl-bearing species. The species used to react with the isocyanate functionality can be described as any hydrogen donor bearing two or more active hydrogens. Although there is a large array of hydrogen donors for use by the paint chemist in the preparation of polyurethane coatings, hydroxyl-based systems are especially useful. Useful hydroxyl-based systems include hydroxylated acrylics, hydroxylated (saturated) polyesters, epoxies and other polyether-based polyols, polycaprolactone-based polyols, castor oil derivatives, and polyamides, phenolics and amino systems. Useful isocyanate-terminated species include the aliphatics, hexamethylene diisocyanate and isophorone diisocyanate and the aromatic species, toluene diisocyanate and diphenylmethyl diisocyanate.

The film-forming resin can be a thermoplastic resin or a thermosetting resin. Thermoplastic resins do not chemically react upon the application of heat but melt and flow over the part to be coated. Upon cooling, the film hardens can be remelted again by the simple application of heat. Thermosetting resins are reactive systems, and a chemical reaction, crosslinking, takes place between the resin and a hardener (crosslinking agent) molecule upon application of heat. This leads to a cured or hardened film which can no longer be melted upon reheating. Thermosetting resins also include water-curing systems, such as moisture curing urethanes.

Suitable examples of thermoplastic resins for powder coating compositions include polyolefins, including low-density polyethylene (LDPE) and polypropylene, polyvinylchloride (PVC), polyamides, polyesters, chlorinated polyethers, and cellulose-acetobutyrate.

What follows is a brief description of some of the film forming resins which may be used in accordance with this invention. A brief description of the curatives and/or curing reactions is also included when the resin is also used as a thermosetting resin.

The film forming resins that are useful include epoxy resins. These include any one of a number of well-known organic resins, which are characterized by the presence therein of the epoxide group

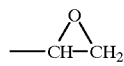

A wide variety of such resins are available commercially. Such resins have either a mixed aliphatic-aromatic or an exclusively non-benzenoid (i.e., aliphatic or cycloaliphatic) molecular structure.

Examples of epoxy resins that can be used include diglycidyl ether of bisphenol A (DGEBA; made by reacting epichlorohydrin with bisphenol A); further reaction products of DGEBA with additional bisphenol A to yield solid, linear and difunctional epoxy resins; and epoxy novolac resins. The epoxy resins can be crosslinked with a variety of hardeners or curing agents to yield coatings with excellent adhesion, good mechanical and physical properties, and very good corrosion resistance. These curing reactions include epoxy-amine reactions, epoxy-phenolic reactions, epoxy-anhydride reactions, epoxy-carboxyl reactions, and epoxy-epoxy reactions.

The film forming resins also include oil-free saturated polyester resins. The words "polyester resin" will henceforth be used to refer to an oil-free saturated polyester resin and is to be distinguished from an unsaturated polyester resin or an alkyd resin. Polyester resins are the reaction products of multifunctional alcohols (such as glycols) with multifunctional acids or acid anhydrides. The ratio of multifunctional alcohol to acid or acid anhydride determines the type of reactive end-group, i.e., an excess of glycol will result in hydroxy terminated (or hydroxy functional) polyesters whereas an excess of acid or acid anhydride will result in a carboxyl terminated (or carboxy functional) polyester. Useful starting materials as far as the acidic portion is concerned include terephthalic acid, isophthalic acid, maleic anhydride, trimellitic anhydride, and adipic acid. Useful multifunctional alcohols include ethylene glycol, diethylene glycol, 1,4-butanediol, trimethylolpropane, and neopentylglycol. For thermosets (thermosetting resins), curing agents for hydroxy functional polyesters include blocked isocyanates. The aliphatic hydroxyl groups of the OH-functional polyester can react with isocyanates as shown in Scheme 1 below:

Scheme 1: Reaction of an aliphatic hydroxyl group with an isocyanate

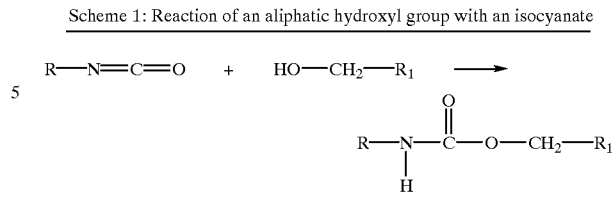

Since this reaction occurs readily at room temperature, it is necessary to block one of the two reactants and this is normally the isocyanate group. A useful blocking agent is ε-caprolactam. Useful isocyanates include toluene diisocyanate (TDI), 4,4'-diphenylmethane diisocyanate (MDI), 1,6-hexamethylene diisocyanate (HMDI) and isophorone diisocyanate (IPDI). In some instances, however, these compounds are considered to be toxic; it is therefore preferable to form an adduct of the diisocyanate with a triol such as trimethylol propane or a diol such as ethylene glycol. This can be done by reacting an excess of the diisocyanate with the alcohol to form an isocyanate terminated adduct, as exemplified in Scheme 2 below.

Scheme 2: Reaction of a diisocyanate with an idol to form an isocyanate terminated adduct

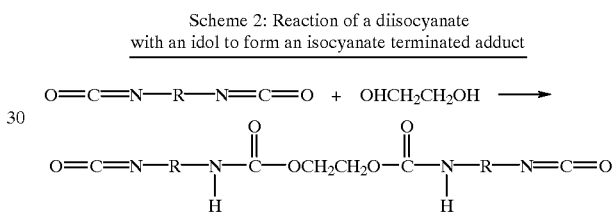

This in turn can be blocked with ε-caprolactam to yield the idealized structure shown in Scheme 3 below:

Scheme 3: Formation of ε-Caprolactam Blocked Isocyanate

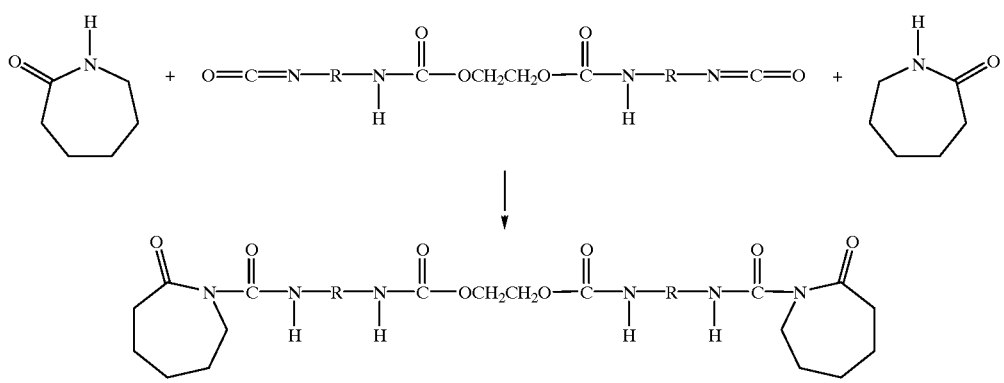

The reactive isocyanate group can be freed during curing and react with the aliphatic hydroxyl groups of the polyester since the ε-caprolactam is released at temperatures above about 160° C.

Other blocking agents for isocyanates (such as ketoximes) can be used provided the blocked isocyanate is a solid at room temperature.

The crosslinking agents useful for the present invention also include those that are self-blocked ("blocked agent free") isocyanates having a uretdione linkage. Examples of these self-blocked isocyanate crosslinking agents include those available from Hüls America under the tradename "VESTAGON™ BF-1540", having an average equivalent weight of about 280 and an isocyanate content (%NCO) of about 14.7 to about 16.7. This crosslinking agent is described as a VESTANAT™ IPDI (isophorone diisocyanate) adduct, which has internally blocked structures. As a result, no blocking agent is liberated during curing. The product can be processed up to the unblocking temperature of greater than about 160° C.

In one embodiment of the present invention, the film forming resin composition comprises a polyester resin and an isocyanate-containing curative. That is, a hydroxy-functional polyester is reacted with a blocked isocyanate to result in a polyurethane. In one embodiment, the hydroxy-functional polyester has a hydroxy equivalent weight of about 1400 (a hydroxyl number of about 40) and an acid number of about 13. It is available from the Ruco Polymer Corporation under the name "RUCOTE™ 102". In one embodiment, the hydroxy-functional polyester has a hydroxy equivalent weight of about 1870 (a hydroxyl number of about 30) and an acid number of about 5. It is available from the Ruco Polymer Corporation under the name "RUCOTE™ 112". The isocyanate curatives typically include blocked isocyanates, which are solids. In a preferred embodiment, the blocked isocyanate is a ε-caprolactam blocked sophorone isocyanate adduct. It has an equivalent weight of about 280 and is marketed by Ruco Polymer Corporation under the name "RUCOTE™ NI-2".

For carboxy functional polyesters, the curing agents include solid polyepoxides and β-hydroxyalkylamides. Useful solid polyepoxide in powder coatings include triglycidyl isocyanurate (TGIC) produced from the reaction between epichlorohydrin and cyanuric acid. The curing mechanism is believed to involve the reaction of the epoxy group with the carboxyl group at elevated temperatures. A base catalyst is sometimes used to accelerate the reaction. Tetrafunctional β-hydroxyalkylamides are believed to crosslink via simple esterification reaction with the elimination of water.

In one embodiment of the present invention, the film forming resin composition comprises an epoxy-polyester hybrid resin. The epoxy component of the hybrid can be a bisphenol A based epoxy resin having an epoxy equivalent weight of about 730 to about 820. It is a "type 3–3.5" resin having on average 3–3.5 hydroxyl-substituted propoxy bisphenol A units (n=3–3.5 on average in structure below):

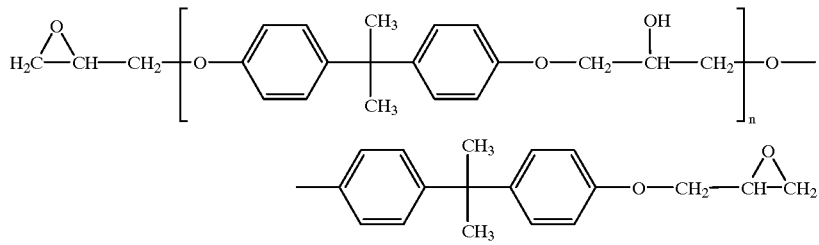

This epoxy resin is available from Dow Chemical Company under the name "D.E.R.™ 663U". The polyester resin in this epoxy-polyester hybrid is believed to be a saturated carboxylated (i.e. carboxy-functionalized) polyester resin, having an acid number of about 70 to about 85, and a glass transition temperature of about 56° C. This polyester resin is available from DSM Resins BV under the name "URALAC™ P 5127". The curing reaction for this epoxy-polyester hybrid is believed to involve epoxy-carboxyl reactions, where the carboxyl terminated polyester cures the epoxy resin. The reaction between and epoxy group and a carboxylic acid group proceeds readily at elevated temperatures, producing ester and hydroxy functionalities. This reaction sometimes utilizes a suitable catalyst. A commonly employed catalyst is benzyltrimethylammonium chloride. Other compounds such as 2-methylimadazole can also be used as a catalyst for the curing reaction.

Another class of useful resins are the unsaturated polyester resins. These are characterized by vinyl unsaturation in the polyester backbone. These unsaturated polyesters are obtained by polymerizing unsaturated polycarboxylic acids or anhydrides with polyhydric alcohols using known methods. Examples of the unsaturated polycarboxylic acids include fumaric acid, maleic anhydride, and maleic acid. Examples of polyhydric alcohols include ethylene glycol, propylene glycol, diethylene glycol, glycerol, trimethylol propane, trimethylol ethane, pentaerythritol and bisphenol A.

In one embodiment, the unsaturated polyester resin is an isophthalic unsaturated polyester resin available commercially under the name "AROPOL™ 7501", from Ashland Chemical. In one embodiment, the unsaturated polyester resin is an isophthalic unsaturated resin available commercially under the name "E-270" from Owens Corning.

Another class of resins that can be used in the present invention are the acrylic resins which are obtained by polymerizing a suitable combination of a functional group-containing monomer and another copolymerizable monomer in an ordinary manner. The polymerization reaction is usually initiated by free radical generators such as benzoyl peroxide or azobisisobutyronitrile (AIBN) and the reaction is a four-part process with the following steps occurring at different rates: (1) Initiation, (2) Propagation, (3) Chain transfer, and (4) Termination. The polymerization temperature is ordinarily between about 60° C. and about 100° C. and polymerization time is usually about 3 to about 10 hours. Examples of the functional group-containing monomers include hydroxyl group-containing monomers such as beta-hydroxyethyl acrylate, beta-hydroxypropyl acrylate, beta-hydoxyethyl methacrylate, beta-hydroxypropyl methacrylate, N-methylol acrylamide and N-methylol methacrylamide; carboxyl-group containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxymethylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerized with these functional group-containing monomers include olefinically unsaturated monomers such as ethylene, propylene and isobutylene, aromatic monomers such as styrene, vinyltoluene and alphamethylstyrene; esters of (meth)acrylic acid and alcohols of 1 to about 18 carbon atoms such as methyl (meth)acrylate, ethyl (meth)acrylate, propyl(methacrylate), n-butyl(meth)acrylate, isobutyl(meth)-acrylate, cyclohexyl (meth)acrylate, 2-ethylhexyl(meth)acrylate and lauryl(meth) acrylate; vinyl esters of carboxylic acid of 2 to about 11 carbon atoms such as vinyl acetate, vinyl propionate and vinyl 2-ethylhexanoate; as well as vinyl chloride, acrylonitrile and methacrylonitrile. They may be used either alone or in the form of a mixture of two or more.

Acrylic resins useful for thermosetting powder coatings generally have glass transition temperatures ($T_g$) above about 65° C. and melting ranges between about 70–110° C. to ensure the necessary physical stability and ease of application. In addition to this, they generally possess reactive groups so that they can be crosslinked after application to the substrate. Two types of acrylic resins have been developed to fulfill these requirements, namely hydroxy functional acrylic resins that can be crosslinked with blocked isocyanates and epoxy functional acrylic resins that can be crosslinked with a crystalline dibasic aliphatic acids such as docanedicarboxylic acid and dodecanedicarboxylic acid.

In one embodiment of this invention, the film forming resin composition (a) comprises an acrylic-epoxy hybrid resin. In one embodiment, the acrylic component of this hybrid resin is a saturated carboxylated acrylic resin. In one embodiment this acrylic resin has a carboxy equivalent weight of about 750, an acid number of about 75, a molecular weight of about 17000, and a glass transition temperature ($T_g$) of about 57° C. It is available from S. C. Johnson Polymer under the name "SCX 819". This carboxylated acrylic resin can crosslink with epoxy resins based on Bisphenol A or with other acrylic resins based on glycidyl methacrylate.

In one embodiment of the present invention, the film forming resin composition (a) comprises a saturated hydroxy-functional acrylic resin. In one embodiment, this hydroxy functional acrylic resin has a hydroxy equivalent weight of about 600, a molecular weight of about 18,000, a glass transition temperature ($T_g$) of about 50° C. and a hydroxyl number of about 94. It is available from S. C. Johnson Polymer under the name "JONCRYL™ 587". This acrylic resin can be cured with an isocyanate containing curative such as a blocked isophorone diisocyanate adduct.

In one embodiment, the film forming resin composition comprises an acrylic-polyester hybrid resin. The acrylic-polyester hybrid resin comprises an acrylic resin such as the aforementioned hydroxy functional acrylic resin and a carboxylated polyester resin. The acrylic-polyester hybrid system can also be cured with an isocyanate containing curing agent such as a blocked isophorone diisocyanate (IPDI) adduct.

As already mentioned above, catalysts or accelerators may be used to increase the rate of reaction between a resin and a hardener and are included within the film forming resin composition. They are usually added at levels between about 0.1 to about 1.0% and can be used to either reduce the curing time at a given temperature or alternatively, reduce the curing temperature. The catalyst employed depends on the film forming resin and the hardener. Typical catalysts include imidazoles, cyclic amidine, alkyl/aryl ammonium halides, and zinc alkyl/aryl thiocarbamates.

The concentration of the film forming resin composition in the powder coating composition will vary depending on whether the powder coating composition is a pigmented or clear (i.e. not having any pigments) system. Typically, the concentration of the film forming resin composition will be about 45 to about 95%, more preferably about 60 to about 90% by weight based on the total weight of the powder coating composition.

The Aromatic Ring Compound (B)

Another component of the present powder coating composition is at least one aromatic ring compound comprising at least two substituents, wherein one of the two substituents is selected independently from the group consisting of (i) groups containing at least one carboxy or a carboxy producing moiety; (ii) alkoxy groups; and (iii) halogen groups; and the second substitutent is a nitro or a halogen group.

The ring compound can include a single aromatic ring, such as a benzene ring, a pyridine ring, or a thiophene ring, as well as a polynuclear ring system. The polynuclear ring system can be of the "fused" type or "linked type. In a fused ring system the two rings making up the fused ring systems share two ring atoms, such as found in naphthalene and anthracene. In a "linked" type ring system, at least two ring atoms are linked through bridging linkages to each other. Such bridging linkage can include carbon to carbon single bonds, ether linkages, sulfide linkages, and alkylene linkages. Specific examples of single, and polynuclear ring systems can be found in U.S. Pat. No. 5,281,346.

In one embodiment of the present invention, the aromatic ring compound is a single substituted benzene ring.

The aromatic ring compound contains at least two substituents. In one embodiment, only two and in one embodiment, only three substituents are present.

The substituent or group containing the carboxy or carboxy-producing moiety can be any chemical group that has the carboxy functionality (—C(O)O) present within the group or that is capable of producing the carboxy functionality. This includes groups where the carboxy moiety is directly present, such as carboxylic acid groups (—COOH), ester groups, such as carboalkoxy groups (—C(O)OR), acyloxy groups (—OC(O)R), wherein in each case, R is an alkyl group and anhydrides (cyclic or acyclic). However also included are groups that are capable of producing carboxy moiety under suitable reaction conditions, such as in the presence of moisture or under conditions of hydrolysis, such as acid halide groups (—C(O)X where X is a halogen, most typically chlorine), and cyano groups (—CN).

The second substituent of the aromatic ring compound can be an alkoxy group or a halogen (chlorine, flourine, iodine or bromine) group. In one embodiment the alkoxy group can be represented by the formula —OR wherein R is an alkyl group of 1 to about 5 carbon atoms, and in one embodiment 1 to 2 carbon atoms.

Suitable examples of the aromatic ring compound include nitrobenzoic acids, such as p-Nitrobenzoic acid; alkyl nitrobenzoates, such methyl-4-nitrobenzoate; 3,5-dinitrobenzoic acid, 5-nitro-1,3-benzenedicarboxylic acid, 1-cyano-4-nitrobenzene, 1-chloro-4-nitrobenzene, 4-chlorobenzoic acid, 4-nitroanisole and mixtures thereof. In one embodiment, the alkyl nitrobenzoate is a p-alkylnitrobenzoate and the alkyl group of the alkyl nitrobenzoate is an alkyl group of 1 to 5 carbon atoms, and in one embodiment, 1 to 2 carbon atoms.

Component (B) may be present in any transfer efficiency-enhancing amount. The phrase "transfer efficiency enhancing amount" means any amount of the additive compound that is capable of improving the transfer efficiency of the powder coating composition compared to a powder coating composition without the transfer efficiency additive. In one embodiment, the additive compound is present at a level of at least about 0.5%, and in one embodiment at least about 1%, and in one embodiment at about 2% by weight of the powder coating composition.

As already described, the transfer efficiency of the powder coating composition can be calculated by dividing the change in weight of the substrate caused by the spraying of the powder coating material on the substrate, by the change in weight of the powder coating source from which the powder coating composition is drawn for spraying onto the substrate.

Thus transfer efficiency can be calculated as the absolute value of slope of a line that results from a plot of substrate (panel) weight versus the weight of the powder coating source (dispenser weight). This plot usually results in a straight line with a negative slope. Calculations of instantaneous transfer efficiency can also be made. Details of the method and apparatus for measuring the transfer efficiency of a coating material can be found in U.S. patent application, Ser. No. 09/199,499 (Docket Number 2939B). The value of transfer efficiency obtained can depend on the flow rate of the composition. The flow rate is defined as the weight of powder dispensed (or sprayed by a powder gun) per unit time. Generally, transfer efficiency varies inversely with flow rate; that is, the higher the flow rate, the lower the transfer efficiency. In the determination of transfer efficiency of the powder-coating compositions of this invention, the flow rate has been maintained in the range of about 0.8 to about 1.2 grams/sec.

Other Optional Components of the Powder Coating Composition

The powder coating compositions of this invention can also contain other additives, such as flow control additives, deaerating agents, pigments, fillers, and special effect additives.

Flow control additives are another component of a powder coating composition. In most (though not all) formulations, this component is highly desirable, as without it, it is very difficult to obtain cured films with good flow and appearance and without craters or other surface defects. The flow control additives can be a solid or a liquid; however they normally consist of highly viscous liquids based on polyacrylates. They are supplied either in the form of so-called masterbatches, i.e., they have been added to the resin by the resin manufacturer right after the resin cooking cycle and just prior to flaking, or the additive is absorbed on finely divided silica and can be added to the powder premix directly. Thus even though this component by itself, can be a liquid, the powder coating composition as a whole is in the form of a powder.

The powder coating composition of the present invention can also contain a deaerating agent, such as benzoin. Benzoin is said to act as an anti-pinholing agent and as a degassing aid, and it is generally believed that it improves the appearance of the cured coating.

Pigments can be defined as finely ground materials which are insoluble in the medium (binder) to be used and which provide color and hiding power to the coatings. Pigments can also influence many other important properties of the finished coating such as water permeability, flexibility and impact resistance.

Pigments can generally be divided into inorganic and organic pigments. Inorganic pigments include titanium dioxide, iron oxide, chromium oxide and carbon black. Organic pigments include blue pigments, such as copper phthalocyanine blue, indanthrone blue, carbozole violet; red pigments, such as cadmium red, quinacridone red, and thioindigo red; yellow pigments such as benzidine yellow, and benzimidazolone yellow; orange pigments, such as benzidine orange, green pigments, such as copper phthalocyanine green; and violet pigments such as quinacridone violet.

One or several pigments can be used in a powder coating formulation. The details of the use of pigments are well known to those skilled in the art.

Fillers, also called extenders, are chemically inert materials that are insoluble in the binder to be used and which impart certain properties to the coating. Fillers can lower the cost of a final coating composition, and also affect such properties and gloss, flexibility, flow characteristics, storage stability, density and porosity. Some of the most commonly used fillers include lithopone, barium sulfate, silicates and calcium carbonates.

The powder coating composition can also include certain special effect additives. Special effects such as metallic finishes, hammertone finishes, and textured or structured finishes are, generally, more difficult to achieve with powder coatings than with conventional liquid coatings. Textured finishes can be obtained by the incorporation of certain inert additives such as polypropylene, nylon, and some special waxes. Hammertone finishes are achieved by the incorporation of a contaminant that competes against the flow of the resin system used. In fact, the cured coating can have many craters and in the presence of an aluminum pigment the hammertone effect will appear. Metallic finishes are difficult to achieve in powder coatings due to the lack of orientation effects of pigments or filler particles (due to very high viscosities during film formation). They can also be quite hazardous due to the combustible nature of the metallic pigments. Methods to incorporate metallic pigments to give a metallic finish to coatings include incorporation prior to the extrusion process, post-blending to the finished powder coating, and a special bonding process during which the metallic pigments are bonded to the surface of the powder particles after they have been ground.

Application Method and Manufacturing Process

Application methods for powder coatings are known to those skilled in the art. They include the fluidized bed method, electrostatic fluidized bed method, electrostatic spray method, triboelectric spray method, use of internal and external corona guns, powder bells and powder rotary atomizers, the preferred method being the use of corona guns.

Furthermore, the general manufacturing process for powder coatings is also familiar to those skilled in the art, and include the stages of premixing, melt-mixing (extruding), and pulverizing.

Furthermore, the general manufacturing process for powder coatings is also familiar to those skilled in the art, and include the stages of premixing, melt-mixing (extruding), and pulverizing, and particle sizing (often through the use of sieves).

The additive compound (B) of the present invention is incorporated into the powder coating composition by addition of the additive compound to an extruded composition comprising components other than component (B). In one embodiment, the addition of component (B) to the extruded composition is conducted by grinding component (B) and the extruded composition in a grinding mill. Thus the additive compound is incorporated into the powder coating composition by post addition in a grinding step. The types of grinding mill employed will be well known to one skilled in the art, and include the Retsch mill, Hammer mill and the air classifying mill. A diagram of an air classifying mill is shown in FIG. 1 for illustrating certain preferred embodiments of the present invention. The air classifying mill comprises a clean air inlet, indicated by the arrows 1, a feed inlet (material inlet), indicated by the arrows 2, a separator 3, a shroud and baffle ring 4, a rotor 5 fitted with a bar hammer 6, a mill wall 7, a mill liner 8 (which can be either smooth or textured) and a space (indicated by arrow 9) between the hammer and the liner that corresponds the highest area of impact and a mill outlet (indicated by the arrow 10).

The powder-coating compositions may differ depending on how the post addition of the additive compound is conducted, i.e., how component (B) is added to the extruded composition.

In one embodiment, where the additive is a solid, it is introduced into the air stream (shown by the arrows 1) and the extruded composition is introduced into the feed inlet (shown by the arrows 2) of an air classifying mill. The rotor 5 may be fitted either with cylindrical pins or with flat bar hammers 6. Introducing the additive in the air stream inlet will carry the additive into the highest area of impact. This area (shown by the arrow 9 corresponds to the area of impact between the liner 8 and the hammer 6. Impact between the bar hammer and the introduced components causes pulverization and the centrifugal force produced by impact will throw the ground materials against the mill wall. Although not limited to the following mechanism of action, it is believed that at this highest zone of impact, the particles of the extruded composition are at their highest temperature due to the high friction forces in this zone. The warmed extruded particles soften and accept the dry additive onto their surface. As the particles cool (higher up in the mill), the additives are "frozen" onto the particles's surface. This indicates that the desirable particle size distribution for a solid additive is smaller than the extruded particles. The components then turn to sweep downwardly past the shroud and baffle ring 4 and then through the separator rotor 3, which spins in opposite direction to the main rotor 5. At the separator rotor, the air stream is pulled through the separation blades and into the mill discharge (outlet of mill, shown by the arrow 10).

The solid additive can also be introduced throught the feed inlet. However, the losses due to the finer additive (the additive having smaller particle size than the extruded particle)being pulled through the separator can be quite high due to the additive's fine size (due to air currents). This can also occur if the dry additive is added directly to the flake (extruded composition) prior to milling in a grinding mill. To accomplish the correct treat rate under these circumstances, analytical methods need to be employed so as to determine how much additive is lost in the process of being pulled by the air current (cyclone).

The solid additive can also be premixed with the flake (extruded composition) and introduced directly into the grinding mill. As in the case above (additive being added directly to extruded flakes prior to milling), this method works better for mills that do not use air currents to classify the powder, but rather rely on sized screens to determine particle size, such as the Retsch mill and the Hammer mill.

The solid additive can also be premixed onto some ground powder and the premixed composition introduced into the grinding mill in the air stream (in an air classifying mill) or mixed onto the flake of the extruded composition prior to introduction into the mill. However dry blending of the solid additive into ground powder is not as effective as the introduction of the additive into the air stream inlet (which places the additive into the highest zone of impact), as in the dry blending process, the surface of the particles of the extruded composition are not uniformly treated, i.e. the additive is not placed uniformly onto the surface of the particles of the extruded composition.

In one embodiment, where the additive is a liquid, it is introduced into the air classifying mill by injection of the additive into the area of impact between the hammer and the mill wall. As explained above, this area corresponds to the area of highest impact for the mill. In one embodiment the liquid additive (component (B)) is injected into this area of the mill in the form of atomized spray. The reason for the introduction of the liquid additive into the zone of highest impact is that the extruded composition as it is ground in the mill is coated with the additive (component (B)) and that the high impact zone is the most desirable as the as the creation of the powder will make the area self cleaning of the liquid additive, thus preventing build up of undesired deposits of additive within the mill.

The liquid additive can also be introduced into the air intlet of an air classifying mill, although this is less desirable as the potential for mill deposits of additive exist. Spray applying the additive onto flakes of the extruded composition just prior to introduction into the mill will provide an additive that is ground into the powder itself. To do this requires that the liquid be metered into the feed auger just prior to the entrance to the mill itself.

Another method of incorporating the liquid additive into the powder coating composition is to premix the additive with the flakes of the extruded composition and then the grinding the premixed composition in a grinding mill. This method is commonly used with laboratory mills that do not rely on air classification, but rather use a screen to determine particle size. Examples of these mills include the Retsch Mill and the Hammer mill.

With regard to conducting the grinding of the additive and the extruded composition in an air classifying mill, the introduction of the additive (whether solid or liquid) in such a way as to place it into the highest area of impact can generally result in better transfer efficiency. In this method, the additive compound is believed to be best impregnated into the surface of the extruded composition providing intimate contact of the additive with the surface of the powder particle.

The substrates for powder coatings include metal, wood and plastic, and glass. Examples of substrates that have been powder coated industrially include office furniture, appliances (such as refrigerators, freezers, and washing machines) as well as automotive body panels.

The temperature used to heat the applied powder coating composition on suitable substrates to form the film varies depending on whether the coating composition is a thermoplastic or thermosetting system, with higher temperature being applied for curing the thermosets. The temperature for melting the coating composition ranges from about 70 to about 90° C. (for thermoplastics and thermosets); for curing of thermosets, the temperature is further raised to about 150 to 200° C. The film thickness of the coating ranges from about 10 to 500 microns (about 0.5 to about 20 mils), more preferably about 10 to about 250 microns (about 0.5 to about 10 mils). The cured coatings with the additive are non-flatting and have enhanced slip properties compared to coatings without the additive.

An excellent source describing the chemistry, uses and applications of various resins and additives used in coatings is *Protective Coatings-Fundamentals of Chemistry and Compositions* by Clive H. Hare, Technology Publishing Company, Pittsburgh, Pa. (1994).

A particularly excellent source describing the chemistry, manufacture, and application of powder coatings is *Powder Coatings* by Josef H. Jilek, published by Federation of Societies for Coatings Technology, Darlene Brezinski & Thomas J. Miranda, Eds.(1993).

EXAMPLES

Table 1 lists the ingredients in an acrylic-epoxy formulation that was used to evaluate the transfer efficiency additives of this invention.

TABLE 1

| Materials | Parts by Weight |
| --- | --- |
| Carboxy-functional acrylic polymer | 30 |
| Type 3.5 Bisphenol A epoxy resin | 30 |
| Acrylic flow modifier | 1.0 |
| Benzoin | 0.4 |
| Titanium dioxide | 32 |
| Calcium carbonate | 6.6 |
| | Total = 100 |

Table 2 below lists transfer efficiency data for powder coating compositions of Table 1 with the incorporation of the transfer efficiency additives of this invention.

TABLE 2

| Composition | Transfer Efficiency Additive (at 0.2%)[1] | Average % Transfer Efficiency[2] | % Change in Transfer Efficiency |
| --- | --- | --- | --- |
| Control | None | 49.2 | — |
| A | p-Nitrobenzoic acid | 60.1 | +22.2% |
| B | Methyl-4-nitrobenzoate | 54.6 | +11.0 |
| C | 3,5-Dinitrobenzoic acid | 54.6 | +11.0 |
| D | 5-Nitrophthalic acid | 45.5 | −7.5 |

[1]based on total powder coating composition weight
[2]average of 3 readings unless noted otherwise
Processing:
Premixing- Powder coating components other than the transfer efficiency additive were mixed in a 20" large wearing blender
Extruding- All materials except the transfer efficiency additive were extruded once with a "APV 19PC" twin screw extruder with a barrel length of 15L/D at following parameters:
Barrel zone 1: 90° C.
Barrel zone 2: 100° C.
melting temperature: 70–75° C.
screw r.p.m.: 250
torque: 40–50%
Grinding- The transfer efficiency additive was added to the extruded composition in a post addition grinding step. The coating composition was ground with a Retsch Z-100 mill using a 0.75 mm screen. Then the coating composition was sieved with a 200-mesh (~74 μm) sieve.
Application- The coatings were sprayed with a Nordson Versaspray II powder-gun on aluminum panels by the Corona- method:
Voltage: 60 KV
Delivery air: 1.2 bar
Curing- The panels were cured at 160° C. for 18 minutes.

Table 3 lists the ingredients in a polyester-urethane formulation that was used to evaluate the transfer efficiency additives of this invention.

TABLE 3

Polyester-Urethane Resin Composition Used in Evaluation of the Transfer-Efficiency Additive

| Raw Material Trade Name | Parts by Weight |
| --- | --- |
| Ruco ™ 102[1] | 167.55 |
| Ruco ™ NI-2[2] | 41.92 |
| Uraflow ™ B[3] | 2.43 |
| Lanco-Flow ™ P-10[4] | 4.61 |
| R-960[5] | 83.45 |

[1]Polyester resin (Ruco Polymers); [2]Isocyanate-containing curative (Ruco Polymer); [3]Benzoin (release agent; GCA Chemical); [4]Flow agent (Lubrizol); [5]Titanium dioxide (Dupont)

Table 4 below lists transfer efficiency data for powder coating compositions of Table 3 with the transfer efficiency additives incorporated in the powder coating composition.

TABLE 4

| Composition | Transfer Efficiency Additive (at 0.2%)[1] | Average % Transfer Efficiency[2] | % Change in Transfer Efficiency |
| --- | --- | --- | --- |
| Control | None | 55.0 | — |
| A | 4-Nitrobenzoic acid | 54.6 (average of 7 readings) | ~0 |
| B | 2-Nitrobenzoic acid | 59.9 | +8.9 |
| C | 3-Nitrobenzoic acid | 66.6 | +21.1 |
| D | 4-Chlorobenzoic acid | 62.6 | +13.8 |
| E | 4-Nitroanisole | 68.3 | +24.2 |
| F | 5-Nitrofuroic acid | 63.0 | +14.5 |
| G | 4-Nitrobenzonitrile | 62.3 (average of 2 readings) | +13.2 |

[1]based on total powder coating composition weight
[2]average of 3 readings unless noted otherwise
Processing same as those for Table 2.

The data in Tables 2 and 4 indicate that generally the powder-coating compositions of this invention with the additive compound (transfer efficiency additive) incorporated in them have improved transfer efficiency compared to compositions without the additive compound.

The data in Table 1 indicate that the powder coating compositions of this invention with component B (transfer efficiency additive) incorporated in them have improved transfer efficiency compared to compositions without component B.

Each of the documents referred to above is incorporated herein by reference. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A powder coating composition made from at least two components comprising:
   (A) a film forming resin composition; and
   (B) a transfer efficiency enhancing amount of at least one aromatic ring compound containing at least two substituents, wherein one of the two substituents is selected independently from the group consisting of (i) groups containing at least one carboxy or a carboxy producing moiety; (ii) alkoxy groups; and (iii) halogen groups; and the second substitutent is a nitro or a halogen group; wherein component (B) is incorporated into the powder coating composition by addition of component (B) to an extruded composition comprising components other than component (B).

2. The composition of claim 1 wherein the film forming resin composition (a) comprises a thermoplastic resin.

3. The composition of claim 1 wherein the film forming resin composition (a) comprises a thermosetting resin.

4. The composition of claim 1 wherein the film forming resin composition (a) comprises a resin selected from the group consisting of epoxy resins, oil-free polyester resins, acrylic resins, and mixtures of two or more thereof.

5. The composition of claim 1 wherein the film forming resin composition (a) comprises a polyester resin and an isocyanate-containing curative.

6. The composition of claim 5 wherein the isocyanate-containing curative is an $\epsilon$-caprolactam blocked isophorone diisocyanate.

7. The composition of claim 1 wherein the film forming resin composition (a) comprises an epoxy-polyester hybrid resin.

8. The composition of claim 7 wherein the epoxy-polyester hybrid resin comprises a type 3–3.5 bisphenol A epoxy resin.

9. The composition of claim 7 wherein the epoxy-polyester hybrid resin comprises a saturated, carboxylated polyester resin.

10. The composition of claim 1 wherein the film forming resin composition comprises an acrylic-epoxy hybrid resin.

11. The composition of claim 10 wherein the acrylic-epoxy hybrid resin comprises a saturated, carboxylated acrylic resin.

12. The composition of claim 1 wherein the film forming resin composition (a) comprises an acrylic-polyester hybrid resin and an isocyanate containing curative.

13. The composition of claim 12 wherein the acrylic-polyester hybrid resin comprises a saturated, hydroxy functional acrylic resin.

14. The composition of claim 1 wherein the addition of component (B) to the extruded composition is conducted by grinding component (B) and the extruded composition in a grinding mill.

15. The composition of claim 1 wherein component (B) is a solid.

16. The composition of claim 1 wherein component (B) is a liquid.

17. The composition of claim 14 wherein the grinding mill is a Retsch mill or a Hammer mill.

18. The composition of claim 14 wherein the grinding mill is an air classifying mill comprising a feed inlet, an air stream inlet, a rotor fitted with a bar hammer, a mill liner and an area of impact between the bar hammer and the mill liner.

19. The composition of claim 18 wherein component (B) is a solid and is introduced into the air stream inlet and the extruded composition is introduced into the feed inlet.

20. The composition of claim 18 wherein component (B) is a liquid and is into introduced into the mill by injection of component (B) into the area of impact between the bar hammer and mill liner.

21. The composition of claim 20 wherein component (B) is injected in the form of atomized spray.

22. The composition of claim 1 wherein the aromatic ring compound of component (B) contains a single aromatic ring.

23. The composition of claim 1 wherein the aromatic ring compound of component (B) contains fused rings.

24. The composition of claim 1 wherein the aromatic ring compound of component (B) is a substituted benzene ring.

25. The composition of claim 1 wherein the aromatic ring compound of component (B) contains 2 substituents.

26. The composition of claim 1 wherein the aromatic ring compound of component (B) contains 3 substituents.

27. The composition of claim 1 wherein component (B)(i) is selected from the group consisting of carboxylic acid groups, carboxylic acid halide groups, carboalkoxy groups, acyloxy groups, and cyano groups.

28. The composition of claim 1 wherein component (B) comprises a nitrobenzoic acid, an alkyl nitrobenzoate or a mixture thereof.

29. The composition of claim 20 wherein the alkyl group of the alkyl nitrobenzoate is a methyl group.

30. The composition of claim 1 wherein the aromatic ring compound of component (B) comprises at least one carboxylic acid group or a carboxylate ester group and at least one nitro group.

31. The composition of claim 1 wherein component (B) comprises p-nitrobenzoic acid.

32. The composition of claim 1 wherein component (B) is selected from the group consisting of 3,5-dinitrobenzoic acid, 5-nitro-1,3-benzenedicarboxylic acid, and mixtures thereof.

33. The composition of claim 1 wherein component (B) is selected from the group consisting of 1-cyano-4-nitrobenzene, 1-chlro-4-nitrobenzene, 4-chlorobenzoic acid, methyl-4-nitrobenzoate, 4-nitroanisole and mixtures of at least two thereof.

34. The composition of claim 1 wherein component (B) is present at a level of at least 0.05% by weight of the powder coating composition.

35. The composition of claim 1, further comprising:
   (C) a flow control agent
   (D) a deaerating agent; and
   (E) a pigment.

36. A method for coating a substrate comprising the steps of:
   (I) applying a powder coating composition on said substrate, said coating composition comprising:
      (a) a film-forming resin composition; and
      (b) a transfer efficiency enhancing amount of at least one aromatic ring compound containing at least two substituents, wherein one of the two substituents is selected independently from the group consisting of (i) groups containing at least one carboxy or a carboxy producing moiety; (ii) alkoxy groups; and (iii) halogen groups; and the second substitutent is a nitro or a halogen group; and
   (II) heating the applied powder coating composition from step (I) to form a film.

* * * * *